United States Patent
Perger et al.

(10) Patent No.: US 7,271,954 B2
(45) Date of Patent: Sep. 18, 2007

(54) BINOCULARS WITH AN INTEGRATED LASER RANGEFINDER

(75) Inventors: Andreas Perger, Rotenmühlgasse 3 1120 Vienna, Vienna (AT); Gernot Kettler, Rückersdorf (DE)

(73) Assignees: Leica Camera AG, Solms (DE); Andreas Perger, Vienna (AT)

( * ) Notice: Subject to any disclaimer, the term of this patent is extended or adjusted under 35 U.S.C. 154(b) by 75 days.

(21) Appl. No.: 11/008,255

(22) Filed: Dec. 10, 2004

(65) Prior Publication Data

US 2005/0128576 A1 Jun. 16, 2005

(30) Foreign Application Priority Data

Dec. 12, 2003 (DE) .............................. 103 58 669
Nov. 10, 2004 (DE) ...................... 10 2004 054 182

(51) Int. Cl.
*G02B 23/00* (2006.01)
*G01C 3/04* (2006.01)

(52) U.S. Cl. ...................... 359/407; 359/413; 356/5.01
(58) Field of Classification Search ................ 359/407, 359/412–414; 356/3, 8, 5.01
See application file for complete search history.

(56) References Cited

U.S. PATENT DOCUMENTS

| 937,834 A * | 10/1909 | Stiege ........................ 359/414 |
| 1,022,340 A * | 4/1912 | Steinle ....................... 359/413 |
| 2,910,912 A * | 11/1959 | Wohler ........................ 356/10 |
| 5,231,535 A * | 7/1993 | Peters et al. ................. 359/414 |
| 5,579,165 A * | 11/1996 | Michel et al. .............. 359/630 |
| 5,959,769 A * | 9/1999 | Yoneyama .................. 359/407 |
| 6,292,314 B1 | 9/2001 | Perger |
| 6,903,811 B2 * | 6/2005 | Watanabe .................. 356/5.01 |
| 2003/0002149 A1 * | 1/2003 | Watanabe .................... 359/407 |
| 2004/0207917 A1 * | 10/2004 | Steiner ....................... 359/410 |

FOREIGN PATENT DOCUMENTS

DE 37 04 848 C2 10/1992
DE 199 33 172 C1 1/2001

* cited by examiner

*Primary Examiner*—Mark A. Robinson
(74) *Attorney, Agent, or Firm*—Foley & Lardner LLP

(57) ABSTRACT

Binoculars having an integrated laser rangefinder has two separate housing parts (1, 2) with eyepieces (16, 17) and objectives (18, 19), which are connected to each other via a jointed bridge (3) for eye width adjustment, and in which the first housing part (1) contains a transmitter (4) and a receiver (5) of the laser rangefinder and also an optoelectronic display element (6) in a fixed arrangement with respect to an optical observation axis (7).

24 Claims, 2 Drawing Sheets

BINOCULARS WITH AN INTEGRATED LASER RANGEFINDER

CROSS-REFERENCE TO RELATED PATENT APPLICATIONS

The right of foreign priority is claimed based upon Federal Republic of Germany Priority Application 103 58 669.5, filed Dec. 12, 2003, and Federal Republic of Germany Priority Application 10 2004 054 182.5, filed Nov. 10, 2004, the entire disclosures of which, including the specifications, drawings, claims and abstracts, are incorporated herein by reference.

BACKGROUND OF THE INVENTION

The invention relates to binoculars with an integrated laser rangefinder.

In binoculars of this type disclosed by DE 37 04 848 C2, the two observation systems comprising objective, image inversion system and eyepiece are arranged in a common housing. In order to adjust the eye width, it is only possible for the eyepieces to be adjusted with respect to each other. In the process, the position of the optical axis of the eyepieces with respect to the optical axis of the objectives and inversion systems change. Focusing is generally carried out via an individual eyepiece adjustment.

In the common housing, the functional elements of the laser rangefinder are also arranged in a fixed arrangement in relation to one another and to the beam paths of the observation part. In this case, the entire volume of the housing can be used for the arrangement of the parts. The laser measuring beam is either emitted via a separate optical beam path or via one of the observation objectives. The measured radiation reflected at the object is usually picked up via one of the observation objectives.

The binocular housing is relatively cumbersome and heavy. Focusing the eyepieces is awkward, so that these devices are normally used for observation in the far range, in which focusing is generally not necessary because of the accommodation capacity of the eye.

In comparison, observation binoculars contain a folding bridge, which permits the distance between the optical axes of the two observation systems to be set to the eye spacing. The weight of such binoculars may generally be considerably less than in the case of a rigid housing.

Focusing is carried out via a central rotary knob, which is located on the folding bridge so that it is easy to grip and acts on focusing elements in the objective part. In this way, focusing can be carried out conveniently from remote observation and also near observation.

SUMMARY OF THE INVENTION

The invention is therefore based on the object of combining the advantages of observation binoculars with the additional function of rangefinding and indication in the image field observed.

According to the invention, in binoculars of the type mentioned at the beginning, this object is achieved by the embodiments described below.

The significant inventive idea is to arrange the functional elements for the rangefinding and display of the measured values in a fixed association with the optical beam path and the optical elements of one observation tube.

A further significant design element is to provide only the joint element on the side of the eyepiece with a joint axis, so only this element is assigned the function of the jointed bridge. Only this joint element ensures the parallel alignment of the two telescope axes and the maintenance of this alignment during the eye width adjustment. Strong joint elements and good fitting to the joint axis are the constructional elements for achieving this function.

The joint part on the side of the objective furthermore gives the system the necessary torsional rigidity. Lugs located one on the other and partially encircling one another for this purpose with a central hole and an inserted cylindrical sleeve part are the constructional design elements for achieving this function.

The cylindrical sleeve part accommodates the laser transmitter, whose optical axis is therefore located physically close to the optical axis of the objective picking up the reflected measuring beams. The sleeve part is firmly screwed to a lug of the housing part which contains the rangefinder. This results in a stable position of the laser transmitter in relation to a receiver and a display, and to the observation beam path in this half of the binoculars.

The eyepiece associated with the first housing part can be focused sharply by the user onto the measured value display reflected in, in accordance with his or her visual acuity. Then, a sharp object image is set via the focusing drive in the same observation channel. After that, the other eyepiece can likewise be set sharply to this object image in order to compensate for the visual acuity of the other eye. After that, the sharp setting of the measured value display and of the object observation is maintained for both eyes when the central focusing knob is operated.

BRIEF DESCRIPTION OF THE DRAWINGS

An exemplary embodiment of the binoculars according to the invention is illustrated in the drawings.

DETAILED DESCRIPTION OF THE PREFERRED EMBODIMENTS

Figure 1:
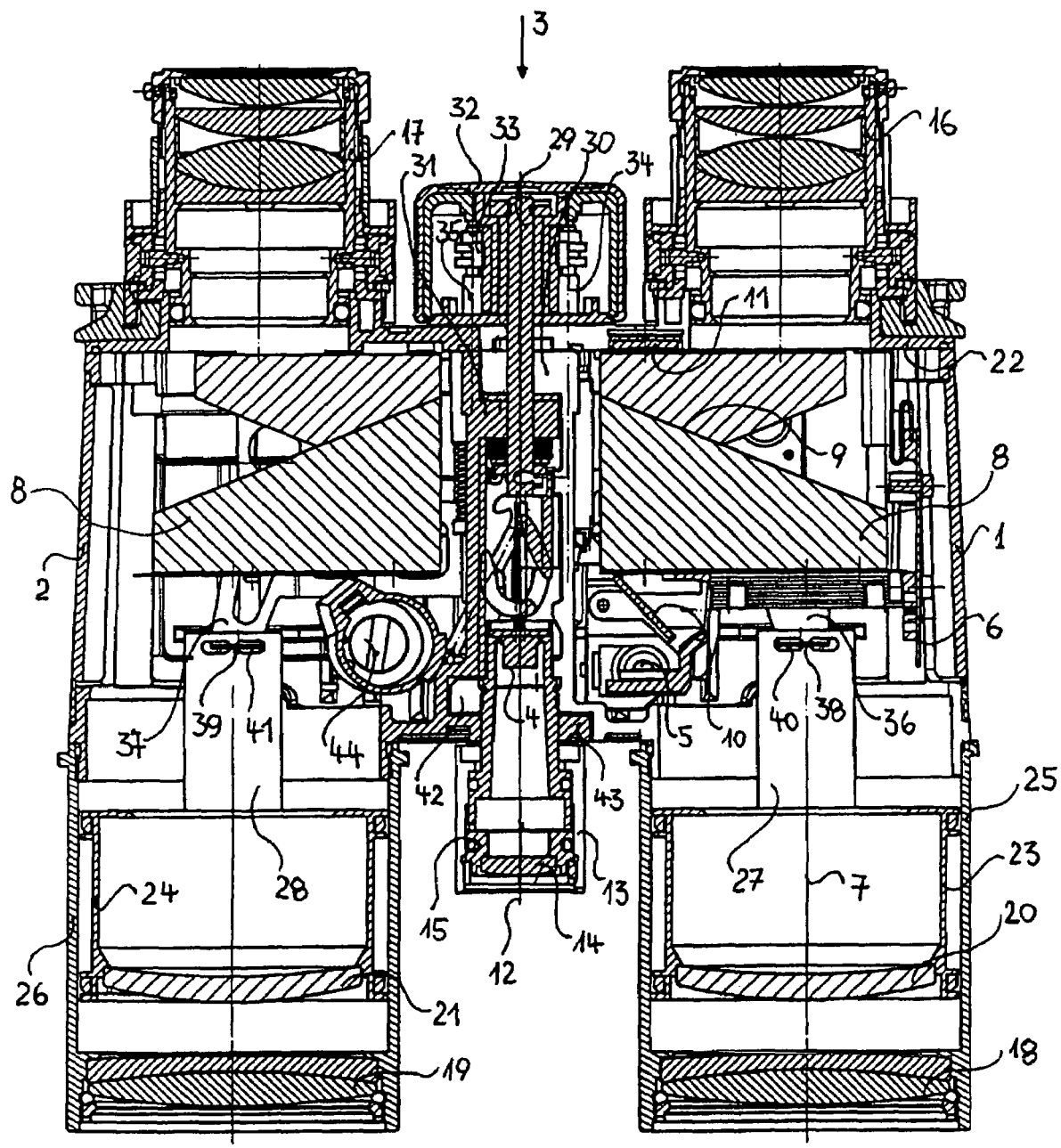
FIG. 1 shows a sectional illustration in plan view from one side.

The sectional illustration according to FIG. 1 shows a view of the underside of the binoculars. A first housing part 1 and a second housing part 2 are connected to each other via a jointed bridge 3 for the purpose of eye width adjustment.

Firmly connected to the first housing part 1 are a transmitter 4, a receiver 5 and a display element 6, as optoelectronic elements of a laser rangefinder. The optical axis of the receiver beam path for the rangefinding coincides with the optical observation axis 7 in the first housing part 1.

The receiving beam path for the rangefinding is coupled out at the deflection and imaging inversion prism 8, corresponding to one of the beam paths described in DE 199 33 172 C1. The infrared measuring beam reflected at the beam-splitting cemented surface 9 of the prism system 8 is led on to the receiver 5 through a beam-splitting mirror 10 following further deflection. The beam of the measuring result, displayed visibly on the display element 6, is reflected at the beam-splitting mirror 10 and passes through the cemented surface 9 onto a hollow mirror 11 and, following reflection at the cemented surface 9, is led into the optical observation beam path.

A further receiver, not illustrated, for visible radiation can be arranged beside the receiver 5, measuring the brightness in the object space via a beam running parallel to the observation axis 7. The measured signal can be used to control the brightness of the measured value display on the display element 6. The brightness of the measured value display can thus be matched to the brightness in the observed image field.

The alignment of the line of the display element 6 is selected such that when the two housing parts 1, 2 are set to an average eye spacing of, for example, 65 mm, all the display lines lie parallel to the horizon.

The transmitter 4 provided for the rangefinding is a diode laser, whose transmission axis 12 is aligned parallel to the observation axis 7. The diode laser is arranged in a cylindrical sleeve part 13, which contains a collimation lens 14 on the light exit side. The collimation lens 14 is held in a double eccentric mount 15 for the alignment of the transmission axis 12 and can be set at a distance from the emission surface of the diode laser by inserting shims, not illustrated, in order that an optimally collimated transmission beam is aimed at the appropriate object. The sleeve part 13 is firmly connected to the first housing part 1.

Each of the housing parts 1, 2 contains an eyepiece 16, 17, an objective 18, 19 and an axially displaceable focusing element 20, 21. Identical prism systems 8 are provided in both housing parts 1, 2 for image inversion. The prism system 8 and the optoelectronic components assigned to it in the first housing part 1 for rangefinding are arranged on a common mounting platform 22, on which they can be aligned optically with respect to one another before being inserted into the housing part 1.

The focusing elements 20, 21 are in each case held in mount sleeves 23, 24, which are mounted in objective tubes 25, 26 such that they can be displaced axially and slide rotationally. Integrally molded on the mount sleeves 23, 24 are tongues 27, 28, which engage in a rotationally secure manner in a transmission mechanism for the focusing, yet to be described. In order to mount the focusing elements 20, 21 and the objectives 18, 19 on the housing parts 1, 2, the tongues 27, 28 are hooked into the aforementioned transmission mechanism. After that, the objective tubes 25, 26 are pushed over the mount sleeves 23, 24 and screwed to the housing parts 1, 2.

The two housing parts 1, 2 are connected to each other via a jointed bridge 3 for the purpose of eye width adjustment. On the eyepiece side, the jointed bridge 3 contains a joint axis (a cylindrical rod) 29, which passes through a joint eye 30 fixed to the first housing part 1 and a joint eye 31 fixed to the second housing part 2 with a close clearance fit. The two joint eyes 30, 31 are fixed in the axial direction with respect to each other in their position on the joint axis 29. Rotatably mounted on the joint axis 29, between the eyepieces 16, 17, is a rotary knob 32 for the axial displacement of the focusing elements 20, 21. For this purpose, the rotary knob 32 contains a disk 33 which can be displaced in the axial direction, is provided with a circumferential web, engages in heads belonging to two axially displaceably mounted rods 34, 35 and provided with a circumferential groove. For the purpose of play-free engagement between the heads and the web, one rod 34 is mounted under spring pressure in the direction of the eyepiece, and the other rod 35 is mounted under spring pressure in the direction of the objective.

Figure 2:
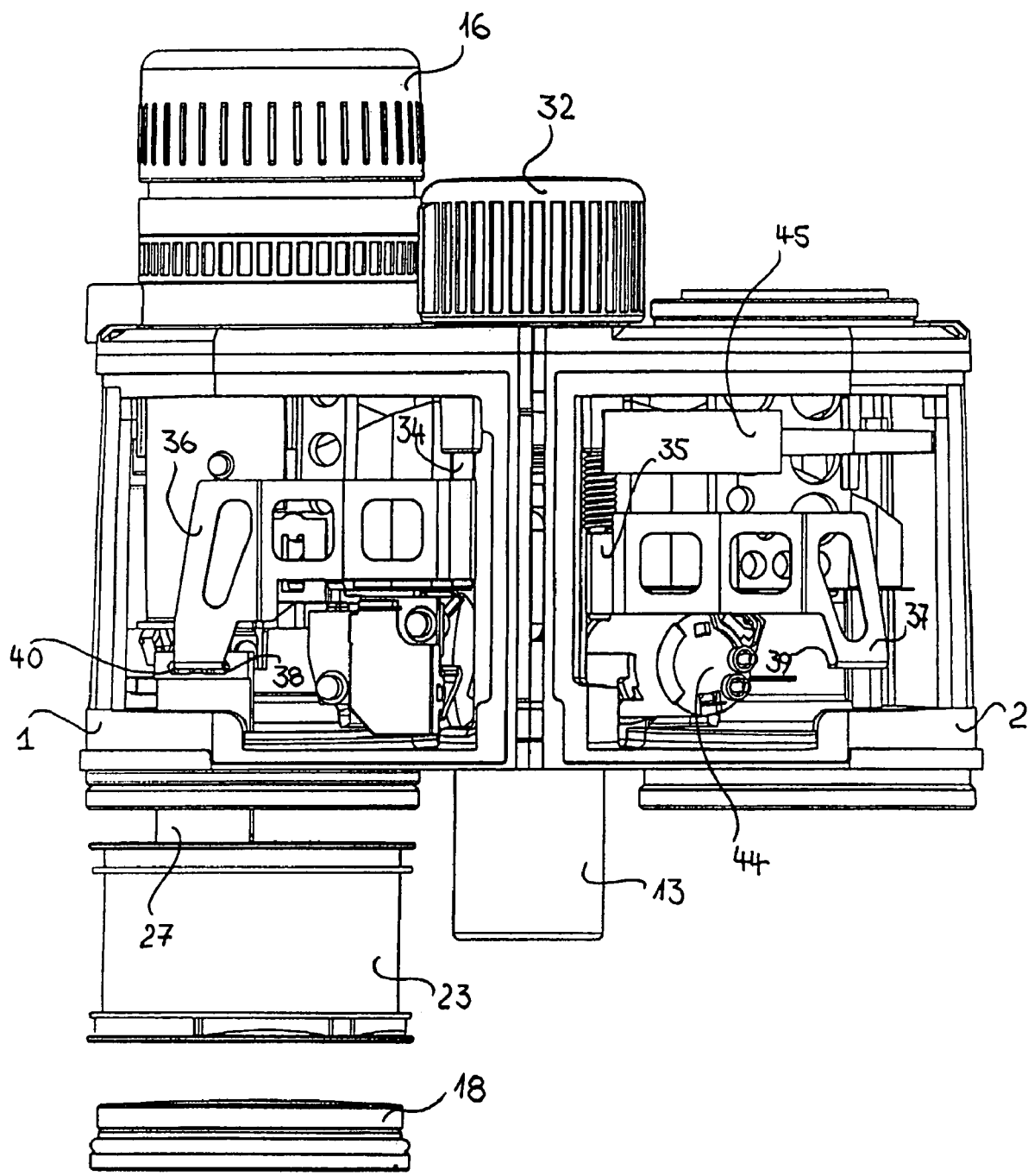
FIG. 2 shows a sectional illustration in plan view on the side underneath.

As can be seen from FIG. 2, the rods 34, 35 are connected to transmission arms 36, 37 extending radially. The transmission arms 36, 37 are formed as punched sheet-metal tongues which have great rigidity in the axial direction but, on account of bending points extending axially close to the housing wall, can be guided in the radial direction around the components inserted into the housing parts 1, 2. At their ends pointing in the direction of the objectives 18, 19, the transmission arms 36, 37 are provided with turned-down edges 38, 39, which engage without play in slots 40, 41 in the tongues 27, 28.

On the objective side, the two housing parts 1, 2 are provided with lugs 42, 43 which have relatively large holes to accommodate the cylindrical sleeve part 13. The lug 43 integrally molded on the second housing part 2 is formed in such a way that it engages partly around the lug 42 in the axial direction. The additional centering action of the cylindrical sleeve part 13 inserted into the holes and firmly connected to the first housing part 1 produces a high level of torsional rigidity of the jointed bridge 3.

The eyepieces 16, 17 contain internal, displaceable lens elements. For the purpose of individual adjustment of the imaging sharpness to the eyes of the user, first the sharp image of the measured value display 6 is set by means of displacement of the eyepiece 16. After that, by operating the rotary knob 32 in the same housing part 1, the image of a remote object is set sharply. By means of displacement of the eyepiece 17 of the second housing part 2, a sharp image of the same object is then likewise produced for the other eye (diopter compensation). After that, the sharp image of the measured value display 6 and of the object is maintained for both eyes when the focusing is changed to other objects.

While the optoelectronic components and the electronic circuits for rangefinding and measured value display are accommodated in the first housing part 1, the second housing part 2 contains a battery compartment 44 that is accessible from outside. In addition, however, further electronic measuring devices known per se, for example an electronic direction meter, inclinometer, altimeter, thermometer, image recording chip, GPS receiver or a cable-bound or cable-less interface for data interchange between binoculars and additional devices, can be accommodated there. The aforementioned measuring devices are available in miniaturized embodiments. The prism system 8 which, in the first housing part 1, is used for coupling the measuring beam path out and coupling a measured value display in via separate beam passage regions, can be used in the second housing part 2 to lead part of the observation beams to an image recording chip via these surfaces.

In addition to the battery compartment 44, a pushbutton 45 that can be operated from the outside is arranged on the second housing part 2 for the purpose of selecting, triggering or displaying the different measurement functions. It is preferably located in the vicinity of the eyepiece 17, so that it is easy to grip, on the upper side of the housing part 2 opposite the battery compartment 44.

In view of the large number of possible electronic measuring devices, it should be ensured that the two housing parts 1, 2 are at the same electric potential. For this purpose, it is advantageous to connect the negative terminal of the battery not only to the housing part 2 but also physically to the housing part 1 via a cable connection through the jointed bridge 3.

In order to avoid electronic emission, it is additionally advantageous to provide both housing parts 1, 2 with a shielding film under the external housing sheathing.

LIST OF DESIGNATIONS

1 First housing part
2 Second housing part
3 Jointed bridge
4 Transmitter

5 Receiver
6 Display element for measured value display
7 Optical observation axis
8 Prism system for image inversion
9 Beam-splitting cemented surface
10 Beam-splitting mirror
11 Hollow mirror
12 Transmission axis
13 Cylindrical sleeve part
14 Collimation lens
15 Double eccentric mount
16, 17 Eyepieces
18, 19 Objectives
20, 21 Focusing elements
22 Mounting platform
23, 24 Mount sleeves
25, 26 Objective tubes
27, 28 Tongues
29 Joint axis
30, 31 Joint eyes
32 Rotary knob
33 Disk with web
34, 35 Rods
36, 37 Transmission arms/sheet-metal tongues
38, 39 Turned-down edges
40, 41 Slots
42, 43 Lugs
44 Battery compartment
45 Pushbutton

What is claimed is:

1. Binoculars having a built in laser rangefinder, comprising:
first and second separate housing parts, each with an eyepiece and objective, which are connected to each other via a jointed bridge having an axis of rotation for eye width adjustment, and in which the first housing part contains a transmitter and a receiver of the laser rangefinder and also an optoelectronic display element in a fixed arrangement with respect to an optical observation axis related to the first housing part, whereby one of the transmitter or receiver components is located in the jointed bridge co-axially with the axis of rotation.

2. The binoculars as claimed in claim 1, wherein the jointed bridge comprises a joint rod element on an eyepiece side and a joint element on an objective side having a cylindrical sleeve part, the joint rod element and the cylindrical sleeve part containing the axis of rotation for eye width adjustment.

3. The binoculars as claimed in claim 2, wherein the joint element on the objective side comprises two lugs which are located one above the other in an axial direction and assigned to the two housing parts and having a central hole, into which the cylindrical sleeve part is inserted, the cylindrical sleeve part for accommodating one of the transmitter or receiver components of the laser rangefinder.

4. The binoculars as claimed in claim 3, wherein the cylindrical sleeve part is firmly connected to the first housing part.

5. The binoculars as claimed in claim 3, wherein the cylindrical sleeve part contains a light source.

6. The binoculars as claimed in claim 3, wherein the cylindrical sleeve part contains a laser and collimation optics for projecting a laser measuring beam on to a remote object.

7. The binoculars as claimed in claim 6, wherein the collimation optics are held in a double eccentric mount such that they can be adjusted in a plane perpendicular to the measuring beam direction.

8. The binoculars as claimed in claim 2, further comprising a rotary knob mounted on the joint axis for central displacement of a focusing element assigned to the objectives.

9. The binoculars as claimed in claim 8, wherein the focusing element is displaceably mounted within an objective tube that can be screwed on to the first and second housing parts.

10. The binoculars as claimed in claim 8, further comprising a tongue aligned parallel to the optical axis of an objective and fixed to each of focusing elements which can be brought into engagement with a sheet-metal tongue within the first and second housing parts, and which is connected to a displacement mechanism driven by the rotary knob for the purpose of focusing.

11. The binoculars as claimed in claim 1, wherein the first housing part comprises optical elements for image inversion arranged on a common mounting platform together with optoelectronic components for rangefinding and measured value display.

12. The binoculars as claimed in claim 11, wherein the component for measured value display is aligned in such a way that, when the first and second housing parts are set to an average eye spacing, all display lines lie parallel to the horizon.

13. The binoculars as claimed in claim 11, wherein the mounting platform can be inserted into the first housing part on the eyepiece side.

14. The binoculars as claimed in claim 1, further comprising a battery compartment that is accessible from outside arranged within the second housing part.

15. The binoculars as claimed in claim 14, further comprising a pushbutton that can be operated from outside arranged on the second housing part for the purpose of selecting, triggering or displaying different measurement functions.

16. The binoculars as claimed in claim 1, further comprising an additional electronic measuring device arranged within the second housing part.

17. The binoculars as claimed in claim 16, wherein the additional electronic measuring device comprises an electronic direction meter.

18. The binoculars as claimed in claim 16, wherein the additional electronic measuring device comprises an inclinometer.

19. The binoculars as claimed in claim 16, wherein the additional electronic measuring device comprises an altimeter.

20. The binoculars as claimed in claim 16, wherein the additional electronic measuring device comprises a thermometer.

21. The binoculars as claimed in claim 16, wherein the additional electronic measuring device comprises an image recording chip.

22. The binoculars as claimed in claim 16, wherein the additional electronic measuring device comprises a GPS receiver.

23. The binoculars as claimed in claim 16, wherein the additional electronic measuring device comprises an interface for data interchange between the binoculars and additional devices.

24. The binoculars as claimed in claim 1, wherein the eyepiece on the first housing part is assigned an axially displaceable lens element for individual sharp setting to a measured value display, and the eyepiece on the second housing part is assigned an axially displaceable lens element for individual diopter compensation.

* * * * *